United States Patent
Regan (10) Patent No.: US 9,386,510 B2
(45) Date of Patent: Jul. 5, 2016

(54) SYSTEMS AND METHODS FOR DEPLOYING, CONTROLLING, AND MANAGING WIRELESS COMMUNICATION EQUIPMENT

(71) Applicant: RF Venue, Inc., Ashland, MA (US)

(72) Inventor: Christopher John Regan, Somerville, MA (US)

(73) Assignee: RF Venue, Inc., Ashland, MA (US)

( * ) Notice: Subject to any disclaimer, the term of this patent is extended or adjusted under 35 U.S.C. 154(b) by 146 days.

(21) Appl. No.: 13/833,398

(22) Filed: Mar. 15, 2013

(65) Prior Publication Data

US 2014/0274184 A1    Sep. 18, 2014

(51) Int. Cl.
| | | |
|---|---|---|
| *H04W 72/00* | (2009.01) | |
| *H04W 48/16* | (2009.01) | |
| *H04B 1/00* | (2006.01) | |
| *H04W 24/02* | (2009.01) | |

(52) U.S. Cl.
CPC ............. *H04W 48/16* (2013.01); *H04B 1/0003* (2013.01); *H04W 24/02* (2013.01)

(58) Field of Classification Search
CPC ..... H04W 16/14; H04W 24/08; H04W 24/00; H04W 24/02; H04W 72/082; H04W 72/085; H04W 4/021; H04W 4/04; H04W 72/0453; H04W 52/241; H04W 72/042; H04W 72/044; H04W 24/10; H04W 72/048; H04W 76/025; H04L 5/0057; G06F 1/1637; G06F 3/0484; G06F 3/04842; G06F 3/0482; G06F 3/0488
USPC ................................................ 455/450, 455
See application file for complete search history.

(56) References Cited

U.S. PATENT DOCUMENTS

| | | |
|---|---|---|
| 5,752,164 A | 5/1998 | Jones |
| 5,886,988 A | 3/1999 | Yun et al. |
| 2006/0019679 A1* | 1/2006 | Rappaport ............ H04W 64/00 455/456.5 |
| 2009/0296641 A1* | 12/2009 | Bienas et al. ................. 370/329 |
| 2010/0144278 A1 | 6/2010 | VanHarlingen et al. |
| 2010/0156438 A1* | 6/2010 | Gorin et al. ................... 324/624 |
| 2012/0008514 A1* | 1/2012 | Ponnuswamy ............... 370/252 |
| 2012/0134280 A1 | 5/2012 | Rotvold et al. |
| 2012/0221271 A1 | 8/2012 | Berg et al. |
| 2014/0254392 A1* | 9/2014 | Wolcott et al. ................ 370/242 |
| 2014/0274184 A1 | 9/2014 | Regan |

FOREIGN PATENT DOCUMENTS

WO    WO-2012036640 A1    3/2012

OTHER PUBLICATIONS

International Search Report and Written Opinion issued by the U.S. Patent and Trademark Office as International Searching Authority for International Application No. PCT/US14/22536 mailed Oct. 22, 2014 (14 pgs.).

* cited by examiner

*Primary Examiner* — Tu X Nguyen
(74) *Attorney, Agent, or Firm* — Wilmer Cutler Pickering Hale and Dorr LLP (57) ABSTRACT

Systems and methods are provided for analyzing radio frequency (RF) data. RF data is received from one or more RF sensors, wherein the RF data is collected over a particular frequency range and resolution bandwidth. One or more frequencies not in use are determined based on the RF data and a signal level threshold. One or more recommended frequencies for use are calculated based on the one or more open frequencies and an intermodulation function, wherein each of the one or more recommended frequencies reduces a potential for intermodulation distortion than other frequencies in the frequency range.

21 Claims, 6 Drawing Sheets

SYSTEMS AND METHODS FOR DEPLOYING, CONTROLLING, AND MANAGING WIRELESS COMMUNICATION EQUIPMENT

TECHNICAL FIELD

Embodiments of the invention generally relate to deploying, controlling and managing wireless communication equipment, and more specifically to wireless audio system design, deployment, control and management, including spectrum measurement for the coordination and deployment of wireless audiovisual equipment or other wireless communication devices.

BACKGROUND

Conventional radio frequency spectrum analysis equipment such as scanners, software defined radios, and network analyzers are often used to sweep the radio frequency spectrum in a venue to assist in coordination of wireless systems. High accuracy systems usually require trained engineers to operate but are too costly for the majority of wireless audiovisual equipment operators. Further, conventional spectrum analyzers are commonly used on a temporary basis and are unable to account for intermittent occupation of radio frequencies in the venue over time. Houses of worship, entertainment venues, convention centers, or broadcast facilities, for example, are highly dynamic radio frequency environments with many transmission sources in transit. This can account for significantly different signal levels measured during audio system setup compared to during live operation at showtimes, which exacerbates interference problems and coordination complexity.

There is therefore a need for the strategic deployment, control and management of wireless communication equipment that performs reliably during real-time operation.

SUMMARY

In accordance with embodiments of the present invention, systems, methods, and non-transitory computer-readable media are provided such that novice users untrained in radio frequency measurement and analysis can access real time and historical spectrum data to gain an accurate understanding of a facility's radio frequency activity to maximize spectrum efficiency and ensure high reliability for all users.

An embodiment of the present invention includes a computerized method for analyzing radio frequency (RF) data. The method includes receiving, by a computing device, RF data from one or more RF sensors, wherein the RF data is collected over a particular frequency range and resolution bandwidth. The computing device determines one or more frequencies not in use based on the RF data and a signal level threshold. The computing device calculates one or more recommended frequencies for use based on the one or more open frequencies, wherein each of the one or more recommended frequencies reduces a potential for interference than other frequencies in the frequency range.

An embodiment of the present invention includes a server for analyzing radio frequency (RF) data. The server includes a processor configured to run a module stored in memory that is configured to cause the processor to receive RF data from one or more RF sensors, wherein the RF data is collected over a particular frequency range and resolution bandwidth. The module stored in memory is configured to cause the processor to determine one or more frequencies not in use based on the RF data and a signal level threshold. The module stored in memory is configured to cause the processor to calculate one or more recommended frequencies for use based on the one or more open frequencies, wherein each of the one or more recommended frequencies reduces a potential for interference than other frequencies in the frequency range. The module stored in memory can be configured to calculate the reference frequencies of a plurality of venues.

An embodiment of the present invention includes a non-transitory computer readable medium having executable instructions operable to cause an apparatus to receive RF data from one or more RF sensors, wherein the RF data is collected over a particular frequency range and resolution bandwidth. The instructions are operable to cause the apparatus to determine one or more frequencies not in use based on the RF data and a signal level threshold. The instructions are operable to cause the apparatus to calculate one or more recommended frequencies for use based on the one or more open frequencies, wherein each of the one or more recommended frequencies reduces a potential for interference than other frequencies in the frequency range.

The techniques disclosed herein can provide for radio frequency measurement and analysis equipment that is lower in cost and easier to use than typical radio frequency measurement equipment. The techniques can provide continuous monitoring for more accurate coordination among devices, and can be deployed and operated by novice users. Further, a broad network of the devices described herein can enable spectrum managers, facility owners, system integrators, and device manufacturers to deploy new equipment tailored for the RF environment in which it can be used. The software application and hardware sensor network disclosed herein can provide historical and real time frequency coordination information alongside system design parameters which can, for example, reduce design costs, installation costs, and optimize real time system performance at low cost.

These and other capabilities of the embodiments of the present invention will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the embodiments of the present invention can be more fully appreciated with reference to the following detailed description of the embodiments of the present invention when considered in connection with the following drawings, in which like reference numerals identify like elements.

DETAILED DESCRIPTION

In the following description, numerous specific details are set forth regarding the systems and methods of the embodiments of the present invention and the environment in which such systems and methods may operate, etc., in order to provide a thorough understanding of the embodiments of the present invention. It will be apparent to one skilled in the art, however, that the embodiments of the present invention may be practiced without such specific details, and that certain features, which are well known in the art, are not described in detail in order to avoid unnecessary complication of the embodiments of the present invention. In addition, it will be understood that the embodiments provided below are exemplary, and that it is contemplated that there are other systems and methods that are within the scope of the embodiments of the present invention.

In some embodiments, a web-based analytics and system design application is paired with a network of remote radio frequency sensors. Users access the system for the purpose of designing, monitoring, controlling, coordinating, or optimizing deployment of wireless communication equipment such as microphones. Internet-connected RF sensors are deployed on an ad-hoc basis for scheduled events, or installed permanently for ongoing spectrum management in one or more rooms in a facility.

The systems and methods described below include, in some embodiments, an internet-accessible database and user interface web application for analysis of radio frequency activity from a network of internet connected RF sensors. The systems and methods further embody or include system design optimization and coordination of wireless communication systems in dynamic RF environments such as, for example, tradeshows, live concerts, and multi-purpose facilities. Real-time wireless communication systems such as wireless microphones, intercoms, in-ear monitors, conferencing systems and the like are highly susceptible to signal dropouts, intermodulation distortion, or signal interference from third party transmission sources. Interference events or signal dropouts create distracting audio effects and negatively impact public speakers, audiences, and event producers. These issues are further complicated at high value events such as live television broadcasts, live sports, or theater events. It is therefore critical that wireless audio systems be properly tuned to open channels and coordinated with local transmission sources to ensure reliable operation. The systems and methods of the embodiments of the present invention use inexpensive distributed RF sensors to map operating environments for novice users in order to reduce the probability of interference events and provide a common online portal for all wireless stakeholders in the facility.

Each remotely controlled RF sensor comprises an RF scanning circuit with an external antenna input and data port to connect to the internet via cellular modem or local area network connection. The RF sensor may also comprise a logic board, display driver, graphic interface, local storage medium, and battery. Via the RF sensor's network connection to the web application software, the user sends a signal to one or more RF sensors to perform a scan across a user defined frequency range with a user defined resolution bandwidth. The system may also be configured for periodic scanning to monitor changes in RF activity over time. The RF scanning circuit gathers frequency and amplitude data and transmits that data back to the remote web application for analysis and display. The web application interface dashboard is user configured with various alarms for when one or more user defined frequencies does not meet or exceeds amplitude threshold values. Amplitude threshold values may include upper or lower frequency limits of wireless audio receiver sensitivity or user defined frequency values configured to limit the number of alarm events to severely high or low frequency levels. From the web application dashboard the remote user may switch between RF sensors to view different venues or areas in the facility. In one embodiment, the application may overlay multiple scans to uncover least congested sections of spectrum over time. Once the user has obtained a scan or map from one or more RF sensors, the user may choose to run a frequency allocation and intermodulation program to generate a list of recommended frequencies to use in the venue. This program sets an upper limit for acceptable signal level and generates a list of open or unused frequencies based on scanned frequencies that do not meet the threshold. The program or computer implemented executable code then performs an intermodulation calculation based on the open frequencies list and third party transmitters and tabulates a set of recommended frequencies to reduce the potential for intermodulation distortion events. The intermodulation calculation takes a single frequency or group of frequencies obtained from a frequency scan, and determines their first, second, third, and/or greater harmonic frequencies. The harmonic frequencies are prioritized relative to desired device frequencies to determine a probability of interference. The program or computer implemented executable code can be configured to factor in nearby sources of transmission (e.g., such as third party wireless microphones, which appear on the frequency scan into its intermodulation calculation), rather than just among desired device channels (e.g., as is often performed in the prior art). The user may thus configure wireless audio systems more effectively given local RF conditions, and control and monitor systems over time.

In addition to proper frequency coordination, wireless audio system components must be designed and selected to meet the criteria of receiver sensitivity for favorable performance. Antenna placement, cable loss, and signal attenuation play critical roles and vary substantially from one venue to another or from one wireless configuration to another. Too strong or too weak a signal adversely impacts performance of the system and results in undesirable yet audible side effects, dropouts in audio, or no audio at all. Wireless audio system designers often take into account many factors including desired operating range of equipment, signal attenuation through walls or floors, and length of cable runs, while managing venue owner expectations for cost and aesthetics. The systems and methods of the embodiments of the present invention use a database of common wireless equipment operating specifications, including wireless microphone systems, in-ear monitor systems, intercoms, and/or the like, categorized by product type on a user selectable list or searchable database. For example, the database may include a specific Shure brand wireless microphone model (e.g., the ULX model number), with a specific frequency range such as 554-590 MHz, with a fixed or configurable transmitter output power of 10, 20, 30, or 50 milliwatts. This device may be added to the overall user configured system to assist in the estimation of system performance and optimization of design given device performance specifications.

The system further comprises user defined floorplans and equipment positions to optimize system design prior to deployment. The systems and methods of the embodiments of the present invention estimate characteristics such as operating range by factoring transmission power and frequency with free field range measurements of known equipment, and overlays square footage coverage areas with reduced reception areas beyond walls due to building material attenuation. For example, given the broad range of building materials with different attenuation levels, each of which vary as a function of frequency, the system can be configured to estimate effective range beyond walls by de-rating free space range levels on a sliding scale based on operating frequency. The systems and methods of the embodiments of the present invention application also estimate fringe areas of reception at the outer limits of the coverage zone. This enables system designers to estimate coverage areas and test configurations. It further enables efficient use of spectrum in the facility for all users by visualizing the impact of physically spacing systems apart, reducing transmission power, and re-allocating previously occupied frequencies to adjacent systems.

Furthermore, the systems and methods of the embodiments of the present invention perform a free space loss calculation given the user defined distance between the receiving antenna and transmit antenna. Due to the high variability of multi-path nulls and cross linear polarization fades in indoor environments and for moving transmitters, the system provides a best estimate of signal level at the antenna. Once the signal level calculation is made, the user selects from various antenna types such as ½ and ¼ wave dipoles, log periodic dipole arrays, helical, vagi, local field, or polarization diversity arrays and common mounting positions. Once antenna type is selected, the user selects cable type from a list of common coaxial cables as well as cable length between the antenna and the receiver. The application adds gain level from the antenna type selected and subtracts transmission line loss based on frequency, cable type and length to tabulate the estimated RF signal level at the receiver. For a given receiver, the system determines whether the estimated signal level is adequate enough for optimal system performance. An examplary link budget equation is:

Received Power (dBm)=Transmitter Power (dBm)+ Transmitter Antenna Gain (dBi)+Receiver Antenna Gain (dB)−Transmit Feeder and Connector Losses−Free Space Path Loss (dB)−Fade Margin (dB)−Indoor/Materials Derate Factor (dB)−Transmission Line Loss (dB)−Receiver Feeder and Connector Losses.

The calculated Received Power can be measured against wireless receiver equipment sensitivity requirements to determine if the total link is adequate for successful operation.

Current frequency registration databases provide location, transmit power, and frequency of licensed television and radio broadcast facilities. Using these databases provided by the Federal Communications Commission, wireless audio users can input a zip code and receive a list of known terrestrial broadcast stations in that area. With this list users can tune their wireless audio equipment around such high powered transmitters to prevent interference. However, television stations do not represent the only sources of interference for wireless audio systems. Typically, pre-programmed wireless audio devices encounter other sources of interference once deployed onsite and require re-tuning. In addition to intermittent transmission sources, the systems and methods of the embodiments of the present invention incorporate known sources of interference such as fixed or mobile television transmitters, TV Band Devices, or the like into its RF map, giving the operator a complete view of fixed and intermittent interference sources. The RF Map function can include a list and/or geographic map view of local RF sources, such as RF sources that are registered in FCC databases such as television stations, registered wireless microphones, and/or TV Band Devices, as well as other RF sources, such as unknown or intermittent sources discovered by scan results.

The systems and methods of certain embodiments eliminate the large upfront investment of conventional spectrum analysis equipment through a network node leasing program, node rental programs, and web application subscriptions to enable low cost network access. The systems and methods of the embodiments of the invention also include custom written reports, analysis, and recommendation capability by professional broadcast engineers on behalf of network users. By providing the node on rental or subscription service basis, users can deploy systems for spectrum analysis on an ad hoc basis and at low cost.

The systems and methods of the embodiments of the invention further include distributed antenna capability at each network node, which enables a single node to switch between multiple remote antennas to monitor various areas in the venue. Another aspect of the systems and methods of the embodiments of the invention includes multiple nodes or a node with multiple remote antennas to locate transmitters by time of arrival or angle of arrival. The systems and methods of certain embodiments of the invention also comprise global positioning system modules at each node to accurately track node location and to overlay spectrum data on common internet mapping systems and facility floorplans. By giving the user an accurate and easily identifiable map overlay alongside spectrum data and system design criteria, the systems and methods of certain embodiments of the present invention provide a physical reference for various transmission source locations.

Figure 1:
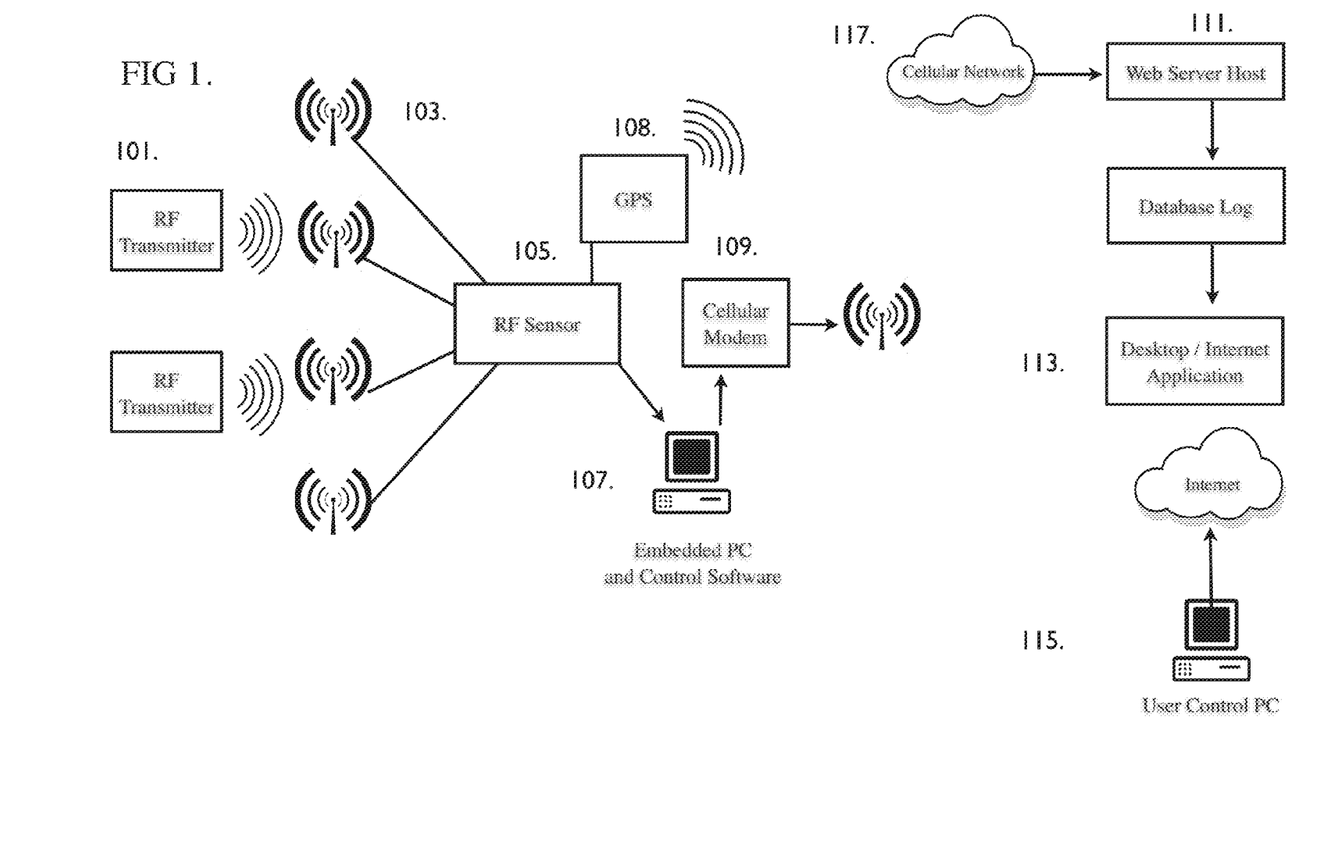
FIG. 1 is an exemplary diagram of a system for deploying, controlling and managing wireless communications equipment, in accordance with embodiments of the present invention.

FIG. 1 is an exemplary diagram of a system for deploying, controlling and managing wireless communications equipment according to an embodiment of the present invention. Referring now to the systems and methods of certain embodiments of the invention in more detail, in FIG. 1, a wideband RF sensor circuit 105, which includes a spectrum analysis function, is shown connected to one or more antenna elements 103 which receive signals from nearby radiowave transmission sources 101. Frequency span for RF sensor 105 can be user defined such as, for example, with a lower limit of 1 megahertz and an upper limit of 18 gigahertz. In some embodiments, to observe transmission source in greater detail, scans may be performed in a narrower span of interest to wireless audio device operators such as, for example, 470-698 MHz. In some embodiments, the resolution bandwidth range may be between 30 Hz and 1 MHz. RF sensor 105 monitors frequency, amplitude, and source orientation or location data of transmission sources 101 from antenna elements 103. RF sensor 105 can alternatively record data at only user defined time intervals to reduce data throughput to remote server or to monitor intermittent transmissions which only occur over defined periods. Remote antennas 103 may be dipole type antennas, directional log periodic or vagi type antennas, or local field floorpad and ceiling tile mounted antennas. Antennas 103 can be distributed into multiple zones in the facility, connected by common coaxial cable types from spectrum analyzer 105 or alternatively via optical cable connection. Global positioning system 108 is integrated with spectrum analyzer 105 and provides common longitudinal and latitudinal location data (e.g., Global Positioning System (GPS) data) for map overlays, theft recovery, and network monitoring. Radio frequency spectrum data collected is logged by embedded PC and control software 107 and transmitted by data connection system 109 to the cellular network 117. Data connection system 109 may be a common USB dongle or standalone cellular data modem. Alternatively data connection system 109 may be a common wireless router or switch connected to a local area network. Data connection system 109 may also be a long range point to point wireless link or long range white space router for rural deployment where no data networks are available. Remote web server 111 receives RF spectrum data from data connection system 109 and hosted web application 113 provides spectrum visualization and data analysis which can be displayed on any internet-connected device 115. Internet-connected device 115 may be any laptop or desktop computer, smartphone, tablet computer, digital sign, or information kiosk.

Figure 2:
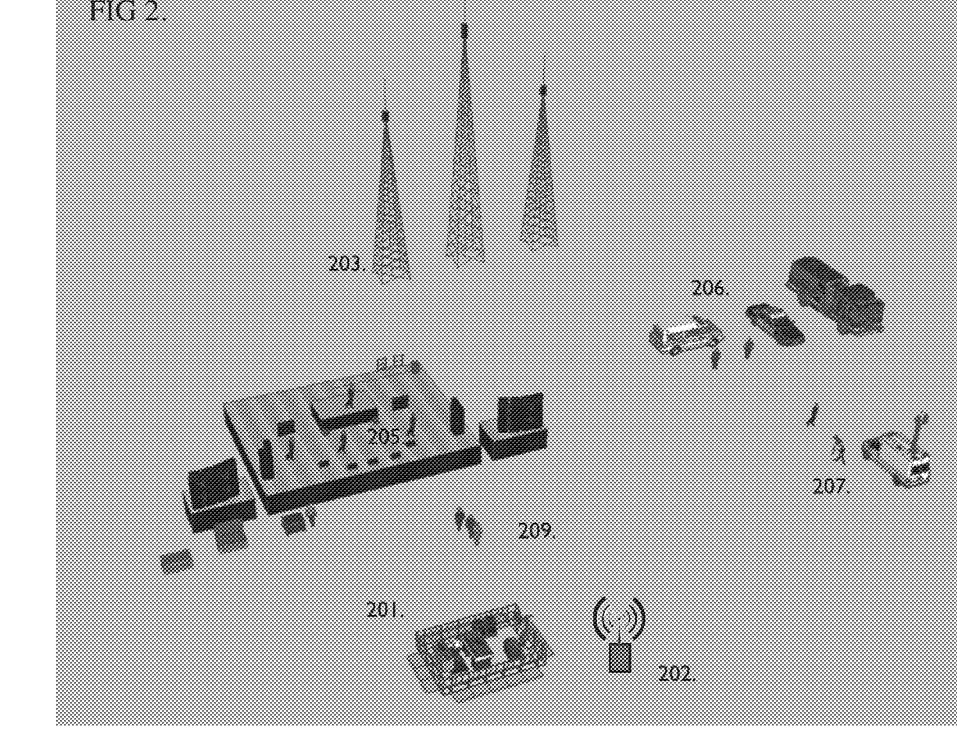
FIG. 2 is an exemplary diagram of an operating environment and typical transmission sources for deploying, controlling and managing wireless communications equipment, in accordance with embodiments of the present invention.

FIG. 2 is an exemplary diagram of an operating environment and typical transmission sources for deploying, controlling and rearranging wireless communications equipment in accordance with certain embodiments of the present invention. Referring now to FIG. 2, various types of radio frequency transmission sources 101 from FIG. 1 are shown in greater detail within the operating area of present invention remote RF sensor device 202. Wireless audio and video equipment operators 201 coordinate frequencies and monitor use for wireless microphones 205 by scanning the local environment for open frequencies (e.g., unused frequencies, or rarely used frequencies). Wireless microphones 205 may also include in-ear monitors, two way radios, wireless intercoms, assisted listening systems, wireless video transmitters and the like. Other mobile transmitters monitored by the device 202 include mobile phones, TV band devices, Digital Enhanced Cordless Telecommunications (DECT) band devices and mobile Industrial, Scientific and Medical (ISM) band devices. Fixed terrestrial television transmitters 203 and intermittent, mobile wireless transmission sources such as public safety systems 206 or news gathering systems 207 are also monitored by the systems 202. Fixed television transmitters 203 may alternatively include fixed TV band devices, ISM band data links, point to point wireless networks and the like.

Figure 3:
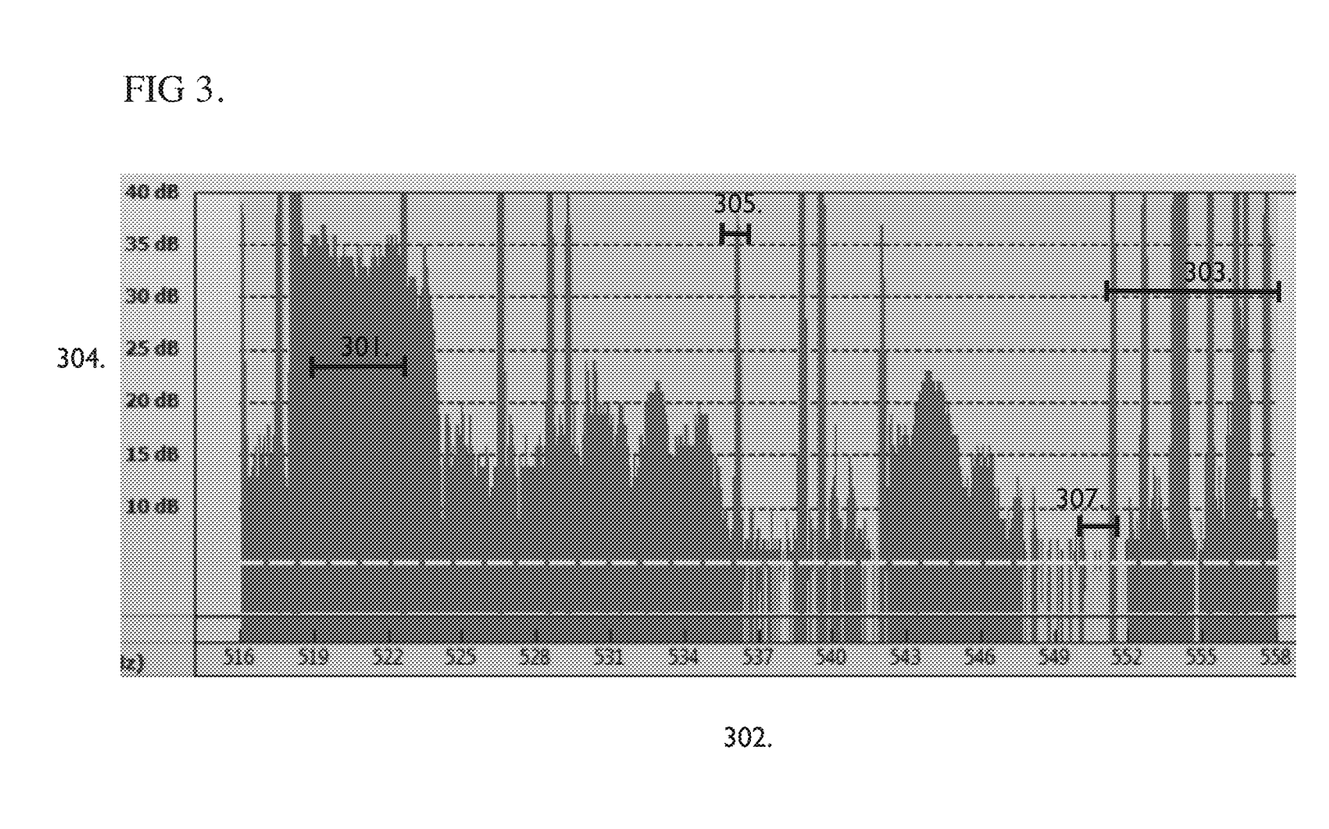
FIG. 3 is an exemplary spectral display for deploying, controlling and managing wireless communications equipment, in accordance with embodiments of the present invention.

FIG. 3 is an exemplary spectral display used for deploying, controlling and managing wireless communications equipment. Referring now to FIG. 3, there is shown in greater detail an RF spectrum analysis of a typical venue shown in FIG. 2, with frequency in megahertz along X-Axis 302 and signal amplitude in decibels along Y-Axis 304. High amplitude, wideband frequencies such as those found at 301 are typically high power transmission sources such as terrestrial television stations 203 as shown in FIG. 2. Narrowband source 305 can be wireless audio systems such as wireless microphones and other wireless devices described in FIG. 2. Large groups of wireless microphones are often coordinated together in a block of frequencies such as at 303. In highly congested RF environments, there can be very few clear channels (e.g., unused frequencies or rarely used frequencies) available such as 307. The systems and methods of the embodiments of the present invention continuously gathers and displays data such as those shown in FIG. 3 to develop location-specific RF spectrum analytics which promotes spectrum efficiency.

Figure 4:
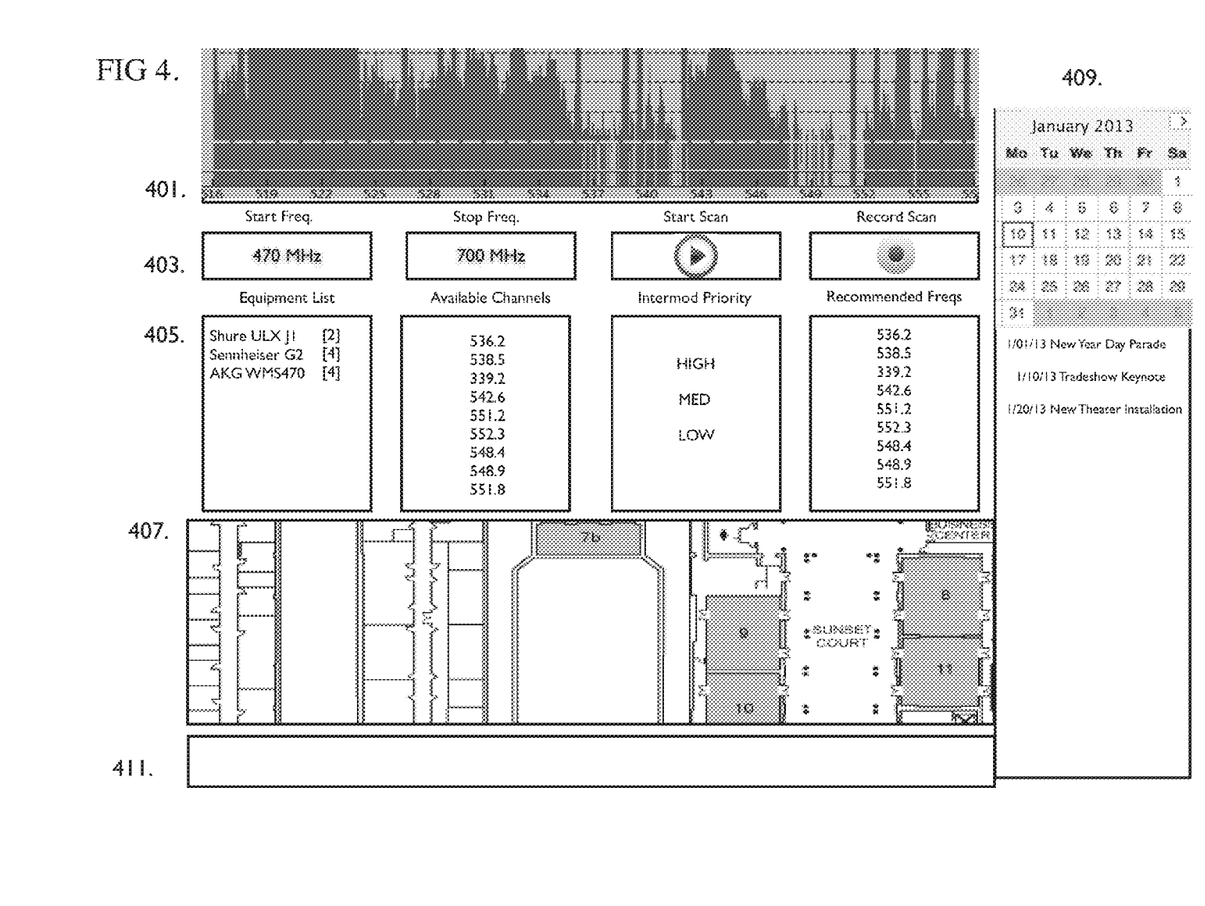
FIG. 4 is an exemplary diagram of a user interface for deploying, controlling and managing wireless communications equipment, in accordance with embodiments of the present invention.

FIG. 4 is an block diagram of a user interface for deploying, controlling and managing wireless communications equipment in accordance with systems and methods of certain embodiments of the present invention. Referring now to FIG. 4, there is shown in greater detail the user interface for the system's 113 hosted web application from FIG. 1. A common frequency-amplitude plot 401 is shown as in FIG. 3, with various input fields 403 for device control including center frequency, start-stop frequency range, pause scan, or record and recall time period. User interface section 405 of the embodiments of the present invention displays information for the user including available frequencies, recommended frequencies, intermodulation calculation settings, and logged alarm events or unauthorized activity.

User interface 405 may be interactive and capable of setting alarm levels at specific frequencies or overlaying device names and types by user input fields. Interface 405 may have alternate data display types including waterfall or heat map type. Interface 407 can display, for example, a floorplan showing distances and remote antenna placement with cable lengths 407 can display a map overlay of device location, with heat map or other overlays of RF activity by location gathered from one or more spectrum analyzers in the area. Section 409 of the user interface displays saved scans taken at various intervals or over various periods for recall and analysis. Section 411 may be a series of dropdown menus to select specific equipment models or system design characteristics such as transmit output power, distance from transmit position to receive antenna, type of antenna, type and length of transmission line, receiver sensitivity and the like. Section 411 may alternatively output transmission line loss calculation, path loss, or signal level estimations at the receiver based user input venue parameters. The user interface of certain embodiments may also include export functions of various common file types including purchased reports and detailed expert analysis. Frequency and amplitude data with intermodulation calculations may be exported into various file formats for import to wireless transmitters to coordinate multi-channel constellation systems.

Figure 5:
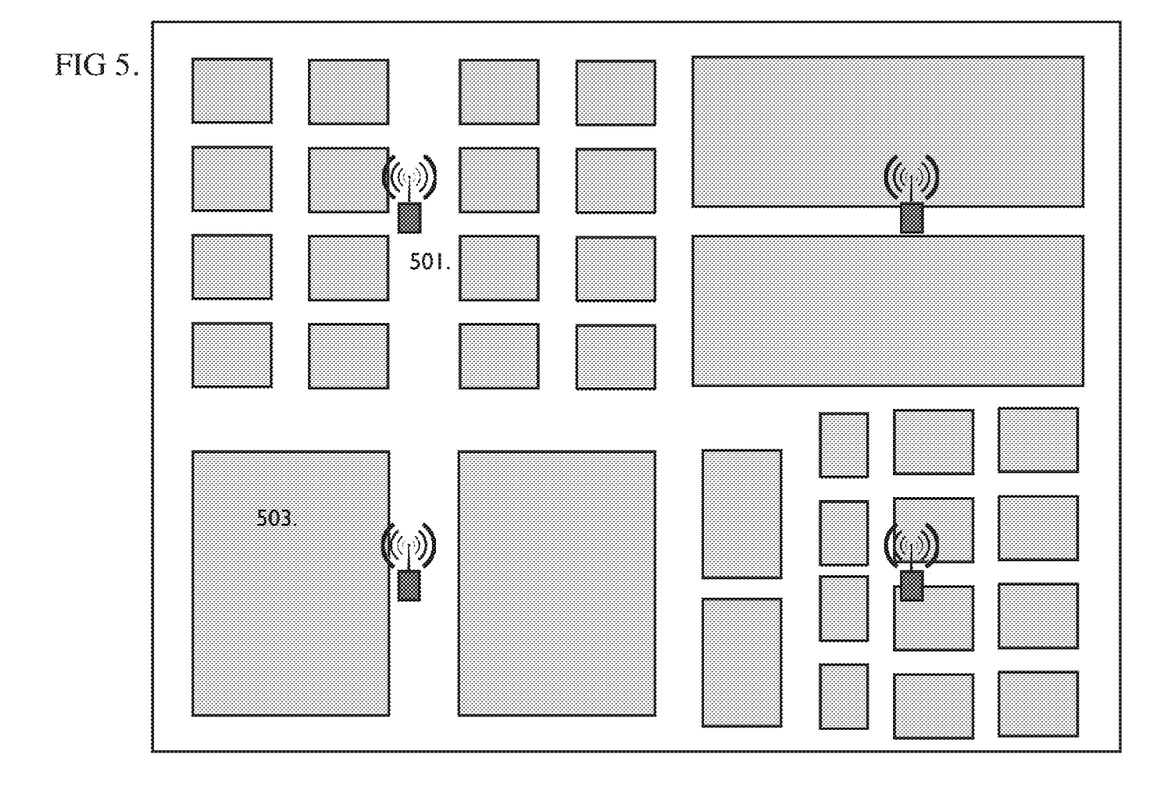
FIG. 5 is an exemplary diagram of an array of spectrum analyzers of a system for deploying, controlling and managing wireless communications equipment, in accordance with embodiments of the present invention.

FIG. 5 is an exemplary diagram of an array of spectrum analyzers for deploying wireless communications equipment. Referring now to FIG. 5, a plurality of remote controlled RF sensors 501 is shown within a large convention center with tradeshow exhibitor areas 503 of various square footage. Each shaded box 503 represents a separate trade show exhibitor area which may use wireless audio systems. The systems and methods of certain embodiments include multiple spectrum analyzers in a facility to provide a more complete analysis and to physically locate transmission sources. In facilities with high spectrum congestion, the systems may enable facility owners to manage third party device frequency, transmission periods, transmission output power settings, antenna positioning, and the like which promote spectrum efficiency and reliability for all users in the facility.

Figure 6:
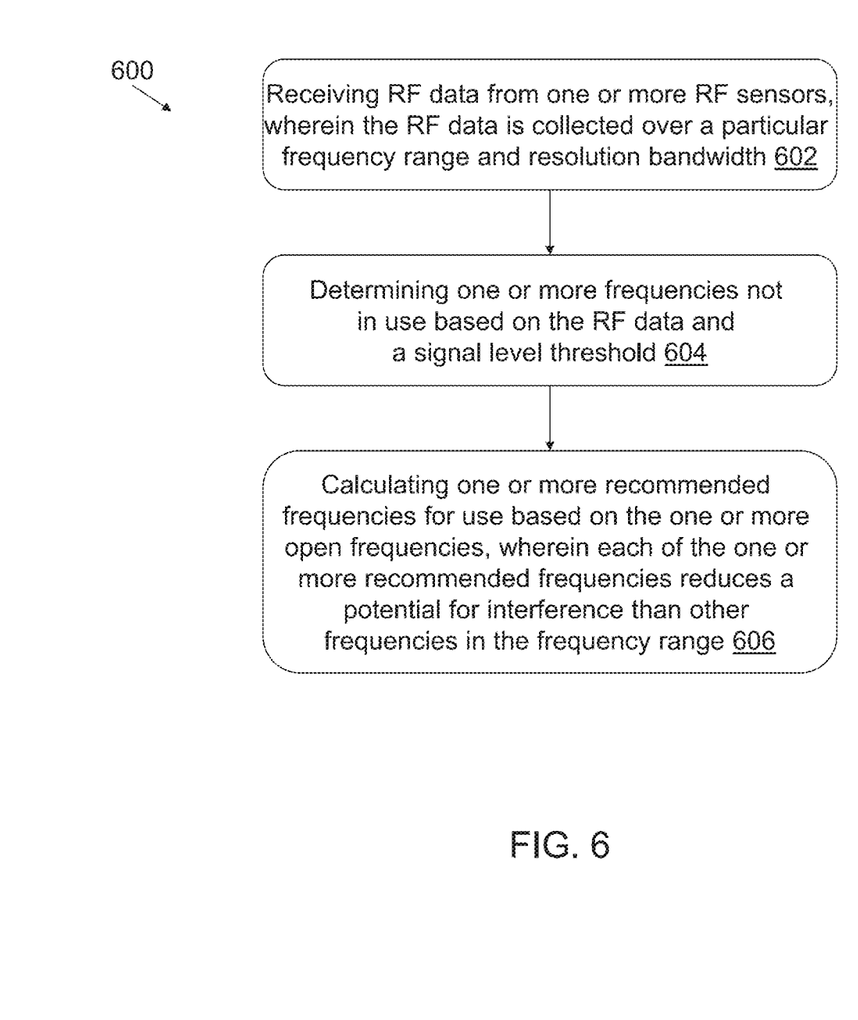
FIG. 6 is an exemplary method for calculating one or more recommended frequencies for deploying, controlling and managing wireless communications equipment, in accordance with embodiments of the present invention.

FIG. 6 is an exemplary method for calculating one or more recommended frequencies for deploying, controlling and managing wireless communications equipment, in accordance with embodiments of the present invention. Referring to FIG. 1, at step 602, remote web server 111 receives RF data from one or more RF sensors 105. The RF data is collected over a particular frequency range and resolution bandwidth. For example, the RF data can be collected over a frequency range with a lower limit of 1 megahertz and an upper limit of 18 gigahertz. In some embodiments, to observe transmission source in greater detail, scans may be performed in a narrower span of interest to wireless audio device operators such as 470-698 MHz. An exemplary typical resolution bandwidth range may be between 30 Hz and 1 MHz. At step 604, the remote web server 111 determines one or more frequencies not in use based on the received RF data and a signal level threshold. The signal level threshold can be, for example, an amplitude level threshold based on an equipment specification minimum to prevent signal dropout or maximum to prevent receiver circuit distortion.

At step 606, the remote web server 111 calculates one or more recommended frequencies for use based on the one or more open frequencies. In some examples, the remote web server 111 calculates one or more recommended frequencies for use based on the one or more open frequencies and an intermodulation function. The intermodulation function can compute, for example, first, second, third and/or greater harmonics and factor those additional sideband frequencies into overall frequency coordination. Each of the one or more recommended frequencies reduces a potential for interference (e.g., intermodulation distortion) compared to other frequencies in the frequency range. For example, referring to FIG. 3, the remote web server 111 can calculate clear channel 307 as a recommended frequency, which reduces a potential for interference compared to frequencies 301, 303 and 305.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. The computer program can include, for example, web application software, scanning software, RF data analysis software (e.g., including the frequency allocation and intermodulation program), and user interface software. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers 115 at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor receives instructions and data from a read only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. See, for example, the interface shown in FIG. 4. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the embodiments of the present invention are not limited in its application to the details of construction and to the arrangements of the components set forth in the following description or illustrated in the drawings. The embodiments of the present invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the embodiments of the present invention. It is important, therefore, that the claims be regarded as including such equivalent constructions insofar as they do not depart from the spirit and scope of the embodiments of the present invention.

Although the embodiments of the present invention have been described and illustrated in the foregoing exemplary embodiments, it is understood that the present disclosure has been made only by way of example, and that numerous changes in the details of implementation of the embodiments of the present invention may be made without departing from the spirit and scope of the embodiments of the present invention, which are limited only by the claims which follow.

What is claimed is:

1. A computerized method for analyzing radio frequency (RF) data to configure one or more wireless audio devices for an event at a venue, the method comprising:

receiving, by a processing unit, user-defined configuration data specifying a particular frequency range and a resolution bandwidth to analyze for available frequencies for the one or more wireless audio devices, wherein:
- the frequency range spans frequencies used by a plurality of different wireless transmission protocols; and
- the frequency range comprises a plurality of frequencies that the one or more wireless audio devices can be selectably configured to operate at by a user for the event at the venue;

receiving, by the processing unit, RF data from one or more RF sensors deployed in the venue, wherein the RF data is collected by each of the one or more RF sensors over the particular frequency range and the resolution bandwidth specified by the configuration data, comprising;
- receiving first RF data at each of the one or more RF sensors for a first period of time;
- receiving second RF data at each of the one or more RF sensors for a subsequent second period of time;
- overlaying, by the processing unit, the first RF data from each of the one or more RF sensors with the second RF data from each of the one or more RF sensors such that the first and second RF data can be analyzed over time;

determining, by the processing unit, one or more frequencies not in use based on the overlaid RF data and a signal level threshold; and calculating, by the processing unit, one or more recommended frequencies for a user for selectively configuring the one or more wireless audio devices to operate at based on the one or more open frequencies, wherein each of the one or more recommended frequencies reduces a potential for interference of the one or more wireless audio devices with other wireless devices present during the event at the venue than other frequencies in the one or more frequencies.

2. The method of claim 1, further comprising:
receiving a first set of RF data from a first set of RF sensors at a first venue;
receiving a second set of RF data from a second set of RF sensors that is different than the first set of RF sensors at a second venue that is different than the first venue;
calculating a first set of one or more recommended frequencies for the first venue; and
calculating a second set of one or more recommended frequencies for the second venue that is different than the first set of one or more recommended frequencies.

3. The method of claim 1, further comprising:
storing, in a database, a set of wireless equipment operating specifications, a set of floor plans, and a set of equipment positions; and
optimizing a candidate system design for a recommended frequency from the one or more recommended frequencies based on at least one of the set of wireless equipment operating specifications, the set of floor plans, and the set of equipment positions.

4. The method of claim 3, wherein optimizing the candidate system design comprises calculating an estimated operating range for an antenna based on a transmission power, a recommended frequency from the one or more frequencies, and a free field range of the antenna.

5. The method of claim 3, wherein optimizing the candidate system comprises:
calculating an estimated RF signal level at a receiver antenna;
selecting an antenna type for the receiver antenna, a type of a cable between the receiver antenna and a receiver, and a length of the cable based on the at least one of the set of wireless equipment operating specifications, the set of floor plans, and the set of equipment positions;
calculating a transmission line loss for the cable based on a frequency of the receiver antenna, the cable type and the length; and
calculating an estimated RF signal level at the receiver based on at least one of (a) a gain level for the selected antenna type, and (b) the transmission line loss for the cable.

6. The method of claim 1, further comprising generating a RF map of a venue where the one or more sensors are deployed based on the received RF data.

7. The method of claim 1, further comprising receiving the RF data from a local area network, a cellular network, or any combination thereof.

8. The method of claim 1, further comprising:
calculating an RF spectrum of the venue in which the RF sensors are deployed; and
displaying the RF spectrum analysis, comprising displaying data indicative of the overlaid RF data from the one or more RF Sensors and the one or more recommended frequencies.

9. The method of claim 1, further comprising transmitting, to each of the one or more RF sensors, a scanning command comprising the particular frequency range, the resolution bandwidth, and a recording command.

10. The method of claim 9, wherein the scanning command comprises a command to start a scan, a command to stop a scan, a command to transmit the RF data to the computing device, or any combination thereof.

11. The method of claim 1, further comprising:
receiving global positioning system (GPS) data for each of the one or more RF sensors;
generating a map of a geographical area of the one or more RF sensors based on the GPS data; and
displaying the map; and
displaying the RF data overlaid on the map.

12. The method of claim 1, wherein calculating the one or more recommended frequencies comprises calculating the one or more recommended frequencies for use based on the one or more open frequencies and an intermodulation function.

13. The method of claim 1, wherein the one or more wireless audio devices include a wireless audio microphone configured to project audio received by the microphone throughout the venue.

14. The method of claim 13, wherein calculating further comprises calculating the one or more recommended frequencies for a user to selectively configure the wireless audio microphone to use one of the one or more recommended frequencies during a live performance occurring on a particular day and time period at the venue.

15. The method of claim 1, wherein the one or more wireless audio devices comprises an in-ear monitor worn by a performer at the venue during the event.

16. A computerized method for analyzing radio frequency (RF) data to configure one or more wireless audio devices for an event at a venue, the method comprising:
receiving, by a processing unit, user-defined configuration data specifying a particular frequency range and a resolution bandwidth to analyze for available frequencies for the one or more wireless audio devices, wherein:
- the frequency range spans frequencies used by a plurality of different wireless transmission protocols; and the frequency range comprises a plurality of frequencies that the one or more wireless audio devices can be selectably configured to operate at by a user for the event at the venue;

receiving, by the processing unit, RF data from one or more RF sensors deployed in the venue, wherein the RF data is collected by each of the one or more RF sensors over the particular frequency range and the resolution bandwidth specified by the configuration data, wherein the RF data is received from a local area network, a cellular network, or any combination thereof, comprising:

receiving first RF data at each of the one or more RF sensors for a first period of time;

receiving second RF data at each of the one or more RF sensors for a subsequent second period of time;

overlaying, by the processing unit, the first RF data from each of the one or more RF sensors with the second RF data from each of the one or more RF sensors such that the first and second RF data can be analyzed over time;

generating, by the processing unit, a RF map of the venue where the one or more sensors are deployed based on the overlaid RF data;

calculating, by the processing unit, an RF spectrum analysis of the venue;

displaying, by the processing unit, the RF map and the RF spectrum analysis, wherein the RF spectrum analysis comprises one or more recommended frequencies for a user for selectively configuring the one or more wireless audio devices to operate at based on the RF spectrum analysis, wherein each of the one or more recommended frequencies reduces a potential for interference of the one or more wireless audio devices with other wireless devices present during the event at the venue.

17. The method of claim 16, wherein the RF spectrum analysis comprises a graph of frequencies used by the one or more RF sensors and an associated signal amplitude for each of the frequencies.

18. A non-transitory computer readable medium having executable instructions operable to cause an apparatus to:

receive user-defined configuration data specifying a particular frequency range and a resolution bandwidth to analyze for available frequencies for the one or more wireless audio devices, wherein:

the frequency range spans frequencies used by a plurality of different wireless transmission protocols; and the frequency range comprises a plurality of frequencies that one or more wireless audio devices can be selectably configured to operate at by a user for the event at the venue;

receive RF data from one or more RF sensors deployed in the venue, wherein the RF data is collected by each of the one or more RF sensors over the particular frequency range and the resolution bandwidth specified by the configuration data, comprising;

receiving first RF data at each of the one or more RF sensors for a first period of time;

receiving second RF data at each of the one or more RF sensors for a subsequent second period of time;

overlay the first RF data from each of the one or more RF sensors with the second RF data from each of the one or more RF sensors such that the first and second RF data can be analyzed over time;

determine one or more frequencies not in use based on the overlaid RF data and a signal level threshold; and calculate one or more recommended frequencies for a user for selectively configuring the one or more wireless audio devices to operate at based on the one or more open frequencies and an intermodulation function, wherein each of the one or more recommended frequencies reduces a potential for intermodulation distortion of the one or more wireless audio devices with other wireless devices present during the event at the venue than other frequencies in the one or more frequencies.

19. A server for analyzing radio frequency (RF) data to configure one or more wireless audio devices for an event at a venue, comprising a processor configured to run a module stored in memory that is configured to cause the processor to:

receive user-defined configuration data specifying a particular frequency range and a resolution bandwidth to analyze for available frequencies for the one or more wireless audio devices, wherein:

the frequency range spans frequencies used by a plurality of different wireless transmission protocols; and the frequency range comprises a plurality of frequencies that the one or more wireless audio devices can be selectably configured to operate at by a user for the event at the venue;

receive RF data from one or more RF sensors deployed in the venue, wherein the RF data is collected by each of the one or more RF sensors over the particular frequency range and the resolution bandwidth specified by the configuration data, comprising:

receiving first RF data at each of the one or more RF sensors for a first period of time;

receiving second RF data at each of the one or more RF sensors for a subsequent second period of time;

overlay the first RF data from each of the one or more RF sensors with the second RF data from each of the one or more RF sensors such that the first and second RF data can be analyzed over time;

determine one or more frequencies not in use based on the overlaid RF data and a signal level threshold; and calculate one or more recommended frequencies for a user for selectively configuring the one or more wireless audio devices to operate at based on the one or more open frequencies, wherein each of the one or more recommended frequencies reduces a potential for interference of the one or more wireless audio devices with other wireless devices present during the event at the venue than other frequencies in the one or more frequencies.

20. The server of claim 19, wherein the module stored in memory is further configured to cause the processor to:

receive a first set of RF data from a first set of RF sensors at a first venue;

receive a second set of RF data from a second set of RF sensors that is different than the first set of RF sensors at a second venue that is different than the first venue;

calculate a first set of one or more recommended frequencies for the first venue; and calculate a second set of one or more recommended frequencies for the second venue that is different than the first set of one or more recommended frequencies.

21. The server of claim 19, wherein the module stored in memory is further configured to cause the processor to:

receive global positioning system (GPS) data for each of the one or more RF sensors;

generate a map of a geographical area of the one or more RF sensors based on the GPS data; and display the map; and display the RF data overlaid on the map.

* * * * *